United States Patent [19]

Yong et al.

[11] Patent Number: 4,508,627

[45] Date of Patent: Apr. 2, 1985

[54] PROCESS FOR MAKING STARCH FLOCCULANTS OF IMPROVED EFFICIENCY

[75] Inventors: Raymond N. Yong; Amar J. Sethi, both of Beaconsfield, Canada

[73] Assignee: Suncor, Inc., Toronto, Canada

[21] Appl. No.: 532,256

[22] Filed: Sep. 15, 1983

Related U.S. Application Data

[63] Continuation of Ser. No. 327,850, Dec. 7, 1981, abandoned.

[51] Int. Cl.³ .................................................. C02F 1/54
[52] U.S. Cl. .................................... 210/728; 127/70; 127/71; 127/33; 210/731
[58] Field of Search .................. 210/728, 731, 907; 127/38, 39, 70, 71, 33; 536/102

[56] References Cited

U.S. PATENT DOCUMENTS

| | | | |
|---|---|---|---|
| 3,374,115 | 3/1968 | Frank et al. | 127/33 X |
| 3,377,171 | 4/1968 | Ryan et al. | 127/71 X |
| 3,640,842 | 2/1972 | Hullinger et al. | 127/71 X |
| 3,977,897 | 8/1976 | Wurzburg et al. | 536/102 X |
| 4,289,540 | 9/1981 | Yong et al. | 127/70 X |

Primary Examiner—Kenneth M. Schor
Attorney, Agent, or Firm—Paul Lipsitz

[57] ABSTRACT

A process for making an improved starch flocculant by heating an aqueous dispersion comprising about 4 to about 12% starch solids, lime and alum until maximum vicosity is obtained, adding a metal salt and finally effecting hydrolysis by additional heating.

17 Claims, 1 Drawing Figure

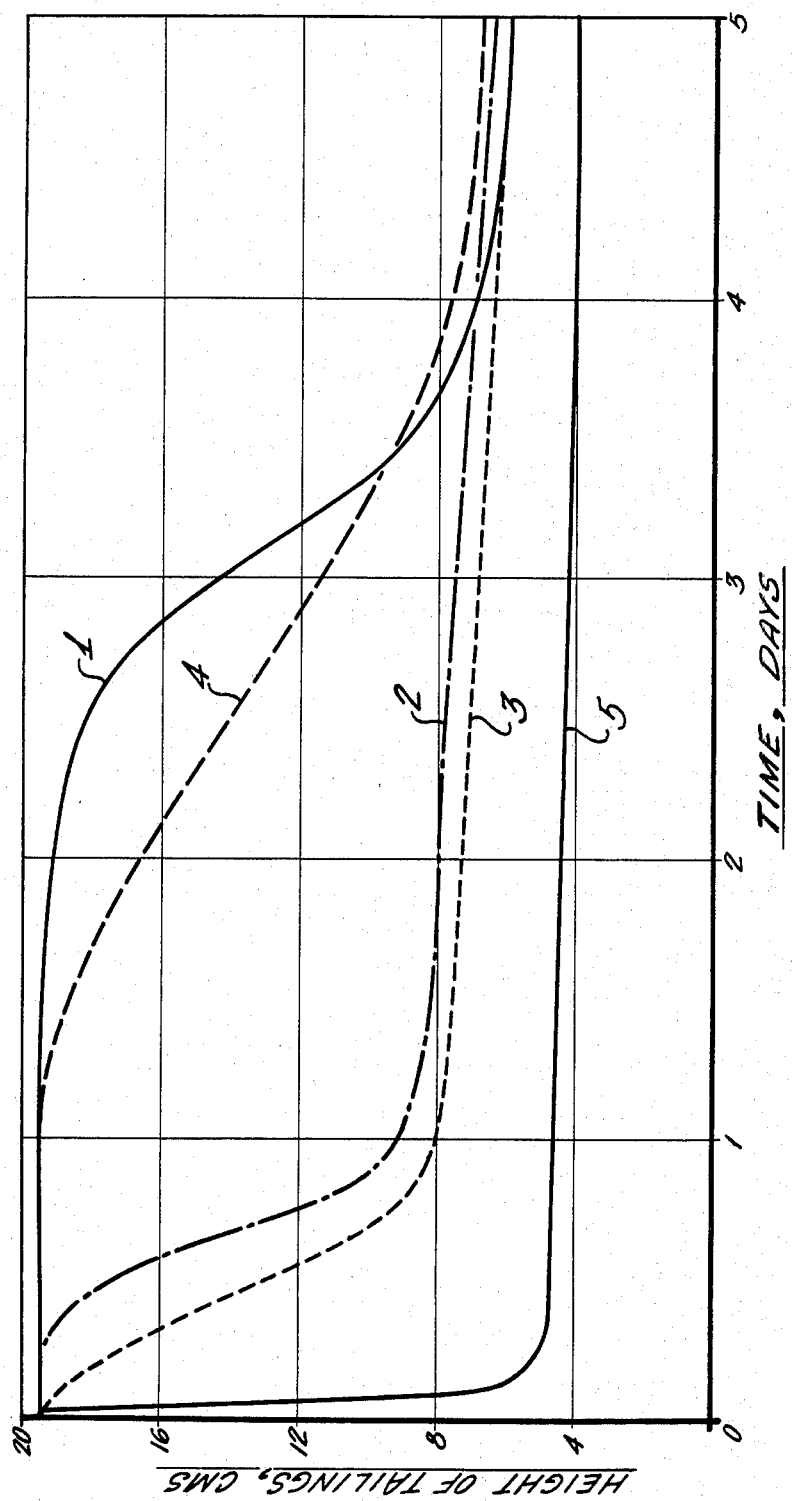

PROCESS FOR MAKING STARCH FLOCCULANTS OF IMPROVED EFFICIENCY

This application is a continuation of application Ser. No. 327,850, filed Dec. 7, 1981, now abandoned.

BRIEF SUMMARY OF THE INVENTION

This invention relates to a novel hydrolyzed starch composition, particularly wheat, corn and potato starch compositions, and processes for making and using the same. More particularly, this invention relates to the discovery that hydrolyzed starches are a more effective flocculant in destablizing dilute as well as thick sludge suspensions when the starch is hydrolyzed in a specific manner; e.g., by heating an aqueous dispersion comprising about 4 to about 12% starch solids, lime and alum until maximum vicosity is obtained, adding a metal salt and finally effecting hydrolysis by additional heating.

BRIEF DESCRIPTION OF THE DRAWINGS

The drawing is a graph having flocculation curves.

DETAILED DESCRIPTION

It is, of course, known to hydrolyze starch by the addition of various metal salts to starch dispersions. For example, U.S. Pat. No. 3,977,897 (Wurzburg, et al., issued Aug. 31, 1978, Class 127/71) describes the heating at moderate temperature of an aqueous suspension of starch granules and an inorganic salt to obtain a non-chemically inhibited starch. British Pat. No. 516,294 (Samuel et al. accepted Dec. 28, 1939) relates to starches modified with inorganic salts or other agents which are agitated in aqueous suspension at elevated temperature with a neutral hydrated metallic salt until a thick and gummy paste is obtained. In the present invention, however, an improved flocculating agent, particularly for sludge suspension is obtained by heating an aqueous suspension of the starch admixed with lime and alum until maximum viscosity is obtained and then the metal salt such as a phosphate salt, is added and hydrolyss effected.

As a result of the process of the invention the hydrolyzed starch obtained provides a more rapid flocculation. The improved hydrolyzed starch is useful with any aqueous suspension which is to be flocculated, particularly aqueous colloidal suspensions containing either clay minerals or metal oxides-hydroxides which are formed in large volume during mining operations. These suspensions are known as slimes and are formed, typically as phosphate slimes or like materials produced in the mining of copper, nickel and titanium. Similarly, in coal and tar sands minings, the mining effluent typically contains dilute or thick clay mineral suspensions.

In order to properly dispose of these voluminous mining discharges, regardless of their source, flocculants have conventionally been employed to destablize these suspensions and thus permit the effective separation of water from the solids.

In one particular aspect, this invention relates to the treatment of tailing pond water obtained from the hot water extraction process for treating bituminous sands, such as Athabasca tar sands, and, more particularly, to the treatment of the water and clay-containing effluent discharged from such a process with a hydrolyzed wheat, corn and potato starch. Tar sands (which are also known as oil sands and bituminous sands) are sand desposits which are impregnated with dense, viscous petroleum. Tar sands are found throughout the world, often in the same geographical area as conventional petroleum. The largest deposit, and the only one of present commercial importance, is in the Athbasca area in the northeast section of the Province of Alberta, Canada. This deposit is believed to contain over 700 billion barrels of bitumen. For comparison, this is just about equal to the world-wide reserves of conventional oil, 60% of which is found in the middle east.

The processing of these tar sands has been described in detail various publications and in copending Canadian application Ser. No. 338,920, filed Oct. 31, 1979 and copending U.S. application Ser. No. 934,560 filed Aug. 17, 1978 in the names of Raymond N. Young and Amar J. Sethi issued Sept. 15, 1981 as U.S. Pat. No. 4,289,540, which disclosure is hereby incorporated by reference. The problems associated with tar sands extraction result primarily from the clay minerals content of the tar sands. In the hot water extraction process, most of the clays become dispersed in the process streams and traverse the circuit, exiting in the tailings. The amount of process water input is fixed by both the clay content of the feed and the need to control viscosity of the middlings stream and the amount of water required for middlings viscosity control represents a large volume relative to the volume of the ore itself. Upon disposal, clays settle only very, very slowly and thus the process water component of tailings is only partially available for reuse via recycle. That which can't be recycled represents a net accumulation of tailings sludge.

The pond water problem makes it necessary to devise long-term economically and ecologically acceptable means to eliminate, minimize, or permanently dispose of the accumulation of liquid tailings or sludge.

Flocculation of the drag stream in order to improve the settling characteristics thereto has been proposed and practiced in the prior art. In flocculation, individual particles (in this case clay particles) are united into rather loosely bound agglomerates or flocs. The degree of flocculation is controlled by the probability of collisions between the clay particles and their tendency toward adhesion after collision. Agitation increases the probability of collision and adhesion tendency is increased by the addition of flocculants.

As aforestated, the sludges being treated in accordance with this invention are aqueous colloidal suspensions containing either clay minerals or metal oxides-hydroxides which are formed during mining operations. For sake of illustration, and simplicity only, the following description will be directed to a colloidal clay suspension obtained from bituminous tar sands mining. However, it will be understood that this invention is directed generally to the destabilization of all such suspensions.

PREPARATION OF THE HYDROLYZED STARCH

As aforementioned, the flocculant preferably is prepared from a wheat, corn or potato starch which has been hydrolyzed. The hydrolysis is achieved by first heating a mixture of the starch, lime and alum in the form of an aqueous suspension at about 80° C. until maximum viscosity is achieved. This is readily done by measuring the viscosity during the heating step with a rotating type viscosimeter and when the increasing viscosity begins to fall, immediately adding an inorganic salt, e.g., a phosphate salt. After the salt is added, additional heating at about 95° C. is effected and the mass held at this temperature for about one hour. The starch should be present in an amount of about 4 gm. to about 12 gm per 100 ml of water, and preferably about 6 g. It has been found that when more than about 12 gm/100 ml is used proper mixing is not achieved.

The salt which is added at maximum viscosity will be in the amount of from about 50% of the stoichiometric to about a stoichiometric amount with respect to the lime ($Ca(OH)_2$). An amount of about 65% of stoichiometric has been shown to be quite satisfactory and is preferred. By "stoichiometric amount" is meant the amount of salt based on the amount of lime used which will produce the insoluble salt (i.e., $CaAlPO_4$ with trisodium phosphate, alum and lime). Preferably the lower amount will be used as this will give a very significant reduction in flocculation time The amount of alum in the system will be from about 5% to about 15% by weight of the starch, the preferred amount being about 10%.

Among the salts which may be employed for this purpose are salts of metals such as sodium, potassium, ammonium, magnesium, calcium, and aluminum. The respective anions may be sulfates, acetates, chlorides, nitrates, chlorates, bromides, iodides, thiocyanates, phosphates and the like. Particularly effective for purposes of this invention, as applied to tar sands tailings ponds, is trisodium phosphate ($Na_3PO_4.12H_2O$).

In carring out the above procedure, an insoluble salt is formed in situ as the starch mixture is mixed after the salt addition. Thus, for example, when the preferred trisodium phosphate is added at the point of maximum viscosity of the starch, lime and alum mixture, insoluble $CaAlPO_4$ is formed during the subsequent heating stage. This resulting salt should desirably be present in amounts of from about 10 to 30 grams per 100 grams of starch and preferably 15 to 20 grams per 100 grams of starch.

Reference is now made to the drawing where the experimental data with a wheat starch are given for various procedures. The curves shown give the settling time for tailings from pond water from Athabasca tar sands processing. In the test procedures used, the height of the tailings in graduated cylinders is observed before and after the dosage of 100 ppm of tailings.

As can be seen from curve No 1, when no flocculant is used, settlement of the tailings does not begin until about the second day and proceeds slowly for another one-half day before settlement accelerates.

Curve 2 shows the flocculation obtained when a trisodium phosphate salt is added in an amount stoichiometric to the lime at 20° C. prior to heating. As can be seen, a significant beneficial effect on reducing settling time is obtained by this usual prior art technique.

Curve 3 illustrates the process of the invention whereby the trisodium phosphate salt is added in a stoichiometric amount at the point of maximum viscosity obtained by heating the starch, lime and alum mixture to about 80° C. In this case an improved flocculation is obtained as shown by the curve which shows no lag time in the start of settlement, and within about one day drops to about 40% of the original height and continues to settle slowly thereafter.

Curve 4 shows the result of using a large amount of the trisodium phosphate salt (150% of the stoichiometric amount of the lime) and it is seen that the beneficial effects of the flocculant are very significantly reduced.

Curve 5 shows the preferred process of the invention where about 65% of the stoichiometric amount of the trisodium phosphate salt based on the lime is used and here the curve shows not only an immediate settlement occurring, but also a reduction of the height to only about 25% of the initial height in about 6 hours.

We claim:

1. A process for making an improved starch flocculant wherein an aqueous dispersion is prepared, said dispersion being comprised of starch, lime and alum, containing from about 4 to about 12 gm per 100 ml of water of starch solids concentration, and having alum present in an amount of from about 5% to about 15% of said starch, and said dispersion is heated until the dispersion reaches maximum viscosity, and when the viscosity begins to fall, a phosphate salt is immediately added in an amount from about 50% to about 100% of the stoichiometric amount based on said lime sufficient to subsequently form a calcium alumino phosphate insoluble salt and hydrolysis is then effected by continued heating to hydrolyze said starch and form said calcium salt, said lime being present in said aqueous dispersion in an amount sufficient to form with said alum and said added metal salt from about 10 to 30 grams of insoluble calcium alumino salt per 100 grams of starch.

2. The process of making an improved starch flocculant wherein an aqueous dispersion is prepared, said dispersion being comprised of starch, lime and alum, containing from about 4 to about 12 gm per 100 ml of water of starch solids concentration, and having said alum present in an amount of from about 5% to about 15% of said starch, and said dispersion is heated until the dispersion reaches maximum viscosity, and when the viscosity begins to fall trisodium phosphate is immediately added in an amount from about 50% to about 100% of the stoichiometric amount based on said lime sufficient to subsequently form a calcium alumino insoluble salt, and hydrolysis is then effected by continued heating to hydrolyze said starch and form said calcium alumino insoluble salt, said lime being present in said aqueous dispersion in an amount sufficient to form with said alum and said added metal salt from about 10 to 30 grams of insoluble calcium alumino salt per 100 grams of starch.

3. The process of claim 2 wherein the dispersion is brought to about 80° C. to effect maximum viscosity.

4. The process of claim 3 wherein after the salt is added hydrolysis is effected by heating at about 95° C.

5. The process of claim 1 wherein the salt added is trisodium phosphate.

6. The process of claim 2 wherein the amount of salt added is about 65% of the stoichiometric amount.

7. The process of claims 1, 2, 3, 4, 5 or 6 wherein the starch is a wheat starch.

8. The process of claims 1, 2, 3, 4, 5 or 6 wherein the starch is a potato starch.

9. The process of claims 1, 2, 3, 4, 5 or 6 wherein the starch is a corn starch.

10. In the process of flocculating tailing pond water with hydrolyzed starch flocculant, the improvement of using a starch flocculant obtained by the process wherein an aqueous dispersion is prepared, said dispersion being comprised of starch, lime and alum, containing from about 4 to about 12 gm per 100 ml of water of starch solids concentration, and having said alum present in an amount of from about 5% to about 15% of said starch, and said dispersion is heated until the dispersion reaches maximum viscosity, and when the viscosity begins to fall a phosphate salt is immediately added in an amount from about 50% to about 100% of the stoichiometric amount based on said lime sufficient to subsequently form a calcium alumino insoluble salt, and hydrolysis is then effected by continued heating to hydrolyze said starch and form said calcium alumino insoluble salt, said lime being present in said aqueous dispersion in an amount sufficient to form with said alum and said added metal salt from about 10 to 30 grams of insoluble calcium alumino salt per 100 grams of starch.

11. The process of claim 10 wherein the dispersion is brought to about 80° C. to effect maximum viscosity.

12. The process of claim 11 wherein after the salt is added hydrolysis is effected by heating at about 95° C.

13. The process of claim 10 wherein the salt added is trisodium phosphate.

14. The process of claim 10 wherein the amount of salt added is about 65% of the stoichiometric amount.

15. The process of claims 10, 11, 12, 13 or 14 where the starch is a wheat starch.

16. The process of claims 10, 11, 12, 13 or 14 where the starch is potato starch.

17. The process of claims 10, 11, 12, 13 or 14 where the starch is corn starch.

* * * * *